United States Patent
Braun et al.

(10) Patent No.: US 9,513,102 B2
(45) Date of Patent: Dec. 6, 2016

(54) ANGLE SENSOR, GEAR WHEEL FOR AN ANGLE SENSOR AND METHOD FOR PRODUCING SUCH A GEAR WHEEL

(75) Inventors: Alexander Braun, Pforzheim (DE); Wolfgang Welsch, Heidelberg (DE); Matthias Waibler, Remshalden-Hebsack (DE); Klaus Burkhardt, Asperg (DE); Mathias Kimmerle, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 419 days.

(21) Appl. No.: 13/996,657

(22) PCT Filed: Oct. 10, 2011

(86) PCT No.: PCT/EP2011/067639
§ 371 (c)(1),
(2), (4) Date: Oct. 14, 2013

(87) PCT Pub. No.: WO2012/084288
PCT Pub. Date: Jun. 28, 2012

(65) Prior Publication Data
US 2014/0043019 A1    Feb. 13, 2014

(30) Foreign Application Priority Data
Dec. 22, 2010    (DE) .......... 10 2010 063 845

(51) Int. Cl.
*G01B 7/30*    (2006.01)
*F16H 55/17*    (2006.01)
(Continued)

(52) U.S. Cl.
CPC ........... *G01B 7/30* (2013.01); *F16H 55/06* (2013.01); *F16H 55/17* (2013.01); *G01D 5/14* (2013.01);
(Continued)

(58) Field of Classification Search
CPC .................. F16H 55/06; F16H 55/17
(Continued)

(56) References Cited

U.S. PATENT DOCUMENTS 4,144,773 A * 3/1979 Addicks .............. 474/161
5,210,489 A * 5/1993 Petersen ............. 324/207.12
(Continued)

FOREIGN PATENT DOCUMENTS

CN    101213431 A    7/2008
CN    101331049 A    12/2008
(Continued)

OTHER PUBLICATIONS

International Search Report corresponding to PCT Application No. PCT/EP2011/067639, mailed Jan. 12, 2012 (German and English language document) (7 pages).

*Primary Examiner* — Jermele M Hollington
*Assistant Examiner* — Zannatul Ferdous
(74) *Attorney, Agent, or Firm* — Maginot, Moore & Beck LLP

(57) ABSTRACT

An angle sensor for determining a rotation angle of a rotatable body, such as a steering column in a motor vehicle, includes a gear wheel. The orientation of a magnetic field generated by the gearwheel is configured to be detected by a magnetic field sensor. The gear wheel is comprised of a magnetisable material, such as hard ferrite, into which a magnetization is introduced. The gear wheel is stronger in a central region than in an edge region in which the teeth are arranged. In order to weakly magnetize the edge region, which minimizes a negative influence of the teeth on the homogeneity of the generated magnetic field, the front face of the gear wheel is configured to be magnetized. The magnetization process advantageously takes place at the same time as an injection moulding process to form the gearwheel. A method is implemented to produce the gear wheel.

11 Claims, 3 Drawing Sheets

(51) Int. Cl.
*F16H 55/06* (2006.01)
*G01D 5/14* (2006.01)

(52) U.S. Cl.
CPC ....... *Y10T 29/49462* (2015.01); *Y10T 74/1987* (2015.01)

(58) Field of Classification Search
USPC .......................... 324/207.13; 74/434; 29/893
See application file for complete search history.

(56) References Cited

U.S. PATENT DOCUMENTS

| | | | |
|---|---|---|---|
| 6,518,754 B1 * | 2/2003 | Edwards | 324/303 |
| 6,578,437 B1 * | 6/2003 | Moerbe | 73/862.328 |
| 7,841,231 B2 * | 11/2010 | Kang et al. | 73/117.02 |
| 2007/0090830 A1 * | 4/2007 | Shiraga et al. | 324/207.25 |
| 2007/0103147 A1 * | 5/2007 | Kondo et al. | 324/207.25 |

FOREIGN PATENT DOCUMENTS

| | | |
|---|---|---|
| CN | 100485307 C | 5/2009 |
| DE | 195 06 938 A1 | 8/1996 |
| DE | 198 16 696 A1 | 10/1998 |
| DE | 197 39 823 A1 | 3/1999 |
| DE | 198 35 694 A1 | 2/2000 |
| EP | 1 777 484 A2 | 4/2007 |
| EP | 1 783 036 A2 | 5/2007 |
| EP | 1510787 B1 * | 3/2008 |
| JP | 2008-241411 A | 10/2008 |
| WO | 2008/013372 A1 | 1/2008 |

* cited by examiner

ANGLE SENSOR, GEAR WHEEL FOR AN ANGLE SENSOR AND METHOD FOR PRODUCING SUCH A GEAR WHEEL

This application is a 35 U.S.C. §371 National Stage Application of PCT/EP2011/067639, filed on Oct. 10, 2011, which claims the benefit of priority to Serial No. DE 10 2010 063 845.5, filed on Dec. 22, 2010 in Germany, the disclosures of which are incorporated herein by reference in their entirety.

BACKGROUND

The disclosure relates to an angle sensor for ascertaining an angle of rotation of a rotatable body, which angle sensor can be used in particular as a steering wheel sensor to ascertain a steering angle of a steering column in a motor vehicle. The disclosure further relates to a toothed wheel for an angle sensor of this type and to a method for producing a toothed wheel of this type.

Angle sensors are known that are embodied to obtain an absolute measurement of an angle of a rotatable body, i.e. also when the body is not moving. An angle sensor of this type is known from DE 195 06 938 A1. In this case, a first toothed wheel is provided on a rotatable body, for example a steering column of a vehicle, which first toothed wheel can co-rotate with the rotatable body by more than 360°. Two measuring toothed wheels mesh with this toothed wheel, wherein the number of teeth of these measuring toothed wheels is less than in the case of a previously known toothed wheel and the number of teeth differs in the case of the two measuring toothed wheels for example by one tooth. It is possible to ascertain an absolute measurement of the angle of the first toothed wheel from the measured angles of the two measuring toothed wheels and consequently to ascertain the angle of the rotatable body.

In order to be able to ascertain the angle of measuring toothed wheels, said toothed wheels comprise magnetic pills in the case of conventional angle sensors. These magnetic pills are embodied from a magnetizable material, for example NdFeB (neodymium iron boron) and/or a moldable matrix material in which the NdFeB particles are embedded. A magnetic pill is fixedly connected to the measuring toothed wheel. The magnetic pill can, for example, be clipped into the toothed wheel. Alternatively, in order to produce the entire measuring toothed wheel, a magnetic pill can be provided as a core and injection molding is performed around said core in the remaining measuring toothed wheel during the injection molding process.

The orientation of the magnetic field that is generated by the magnetic pill can be measured with the aid of a magnetic field sensor that is arranged adjacent to an end face of the measuring toothed wheel. The orientation of the respective measuring toothed wheel can be ascertained from the orientation of this magnetic field and it is ultimately possible with the knowledge of the two orientations of the two measuring toothed wheels to ascertain the orientation and/or the angle of rotation of the rotatable body.

SUMMARY

An angle sensor and a toothed wheel for an angle sensor and a method for producing a toothed wheel of this type can be required, wherein the angle sensor is embodied in a simple manner and yet allows an angle of rotation of a rotatable body to be ascertained precisely.

Such a requirement can be fulfilled by means of the subject matter of the disclosure. Advantageous embodiments are defined in the dependent claims.

A toothed wheel is proposed in accordance with a first aspect of the present disclosure, which toothed wheel can be used as a measuring toothed wheel for an angle sensor, for example a motor vehicle steering angle sensor. The toothed wheel comprises a plurality of teeth along a periphery. The toothed wheel is embodied in accordance with the disclosure completely from a magnetizable material, wherein the toothed wheel is magnetized to a greater extent in the central region of the toothed wheel than in an edge region in which the teeth are arranged.

An angle sensor is proposed in accordance with a second aspect of the present disclosure. The angle sensor comprises at least one toothed wheel or preferably at least two toothed wheels as measuring toothed wheels. Moreover, the angle sensor comprises one or more magnetic field sensors that are allocated to the toothed wheels. A toothed wheel cooperates with the rotatable body, the angle of rotation of which is to be ascertained, in such a manner that the toothed wheel rotates about its angle of rotation as the rotatable body is rotated. The toothed wheel is embodied for the purpose of generating an essentially homogeneous magnetic field in a plane that lies in an orthogonal manner with respect to the axis of rotation and the direction of said magnetic field can be ascertained by means of the magnetic field sensor. The toothed wheel is embodied in accordance with the disclosure completely from a magnetizable material.

A method is proposed in accordance with a third aspect of the present disclosure for producing a toothed wheel for an angle sensor. The method comprises the following method steps: Initially, the entire toothed wheel is produced as one piece from a magnetizable material, for example using an injection molding method or a pressing process. Finally, the toothed wheel is magnetized in such a manner that the level of magnetization in a central region of the toothed wheel is greater than in an edge region.

Findings and ideas to which aspects of the disclosure and/or its embodiments relate are summarized hereinunder and features and advantages of the embodiments in accordance with the disclosure are described.

It has been recognized that the production of toothed wheels for angle sensors in which, as described above, a magnetic pill is inserted into the toothed wheel can be associated with a considerable expenditure of work. Conventional methods involved initially producing a pill from a magnetizable material, for example using the injection molding method. The pill would subsequently be diametrically magnetized, so that the magnetic field generated by said pill is to a great extent homogeneous at least in a central region in a plane that is parallel to the surface of the pill. The process of magnetizing the pill was generally performed on the finished, injection molded pill. The magnetized pill would subsequently either be clipped in or pressed into a separately produced toothed wheel body.

Alternatively, the pill would be injection molded with a toothed wheel body in a subsequent step of the injection molding method.

In order to simplify the production of toothed wheels which generate a magnetic field whose orientation can be ascertained with the aid of a magnetic field sensor, it is proposed to forego producing a magnetic pill separately. It has been recognized that toothed wheels can be embodied not only as the conventional multi-piece embodiment but also as a one-piece embodiment in which the entire toothed wheel is embodied from a magnetizable material in such a manner that said toothed wheels can be used in an appropriate manner in an angle sensor. A production process can be considerably simplified by embodying the toothed wheel in one piece from a magnetizable material.

In order to generate a magnetic field with the aid of the one-piece toothed wheel, the orientation of which magnetic field can be ascertained with a sufficient level of accuracy using a magnetic field sensor, the level of magnetization of the toothed wheel should be greater in a central region that in an edge region. The term 'central region' in this case can be understood to mean a region in the proximity of the axis of rotation of the toothed wheel, for example inside the root circle diameter. The magnetic field sensor can then be arranged adjacent to this central region in the angle sensor. As a consequence of the fact that the toothed wheel is not uniformly magnetized throughout with a diametric magnetization, as is the case with conventional magnetic pills, but rather is instead magnetized in such a manner that the level of magnetization in a central region is greater than in an edge region, it is possible to avoid the magnetization of the teeth of the toothed wheel exerting a disturbing influence, for example, on the homogeneity of the magnetic field generated by the toothed wheel, said teeth being arranged in the edge region of the toothed wheel.

In order to be able to ascertain the orientation of the toothed wheel more precisely with the aid of the magnetic field sensor, it is intended that the toothed wheel generates an essentially homogeneous magnetic field in the central region in a plane that is orthogonal with respect to the axis of rotation of the toothed wheel. The term 'homogeneous' is understood to mean that the magnetic field lines extend in parallel. The term "essentially" can be understood in this case to mean that the generated magnetic field is sufficiently homogeneous in order to be able to ascertain the orientation of the magnetic field using a magnetic field sensor with a degree of accuracy that is required for a particular application. For example, any deviations of the magnetic field lines from the parallel should be less than 5°, preferably less than 2°.

In order to achieve this, an end face of the toothed wheel can be magnetized. A toothed wheel that is magnetized in this manner is also described as being surface-magnetized. As is to be described in detail hereinunder, in order to achieve an end-face magnetization of this type, it is not the entire toothed wheel that is exposed to a homogeneous magnetic field as is the case in a conventional diametrical magnetization. On the contrary, the toothed wheel is exposed to a nonhomogeneous magnetic field during the process of magnetizing the magnetizable material and said nonhomogeneous magnetic field mainly enters the toothed wheel from an end face of the toothed wheel and as a result of said magnetic field being nonhomogeneous, the toothed wheel can be magnetized to a greater extent in the central region than in the edge region. The end-face magnetization can be embodied in the form of a 2-pole magnetization. Alternatively, it is also possible to use 4-pole, 6-pole or generally 2n-pole (n=1, 2, 3, . . . ) magnetizations.

The toothed wheel can, for example, be embodied from a magnetizable material, wherein magnetizable particles are embedded in a shapeable matrix material. The matrix material can, for example, be a material that can be processed using the injection molding method or a pressing process. As a consequence, it is possible to produce the toothed wheel in a simple manner in only one shaping step.

It has been established that hard ferrite can be used advantageously as a material for the magnetizable particles. It can be produced in a cost-effective manner and can be magnetized in an advantageous manner.

In order to produce the toothed wheel, said toothed wheel can be injection molded or pressed, wherein it can be advantageous to magnetize the toothed wheel directly in the mold used to produce said toothed wheel. As the toothed wheel can be embodied in one piece using only one molding process, the entire production process including the magnetization process can consequently be performed in a single device. It is possible, for example, to exploit the fact that a magnetization process that is performed as an injection molded material is hardening can result in a stronger magnetic field being generated through the toothed wheel than the magnetic field that is generated through the toothed wheel when subsequently magnetizing the completely hardened toothed wheel.

The magnetization process can be performed with the aid of permanent magnets and/or electromagnets that are arranged adjacent to an end face of the toothed wheel. By arranging the magnets in this manner, it is possible to generate a desired end-face magnetization of the toothed wheel in a simple manner. It has been demonstrated particularly when using ferrite in the magnetizable material that as a result of ferrite being simple to magnetize said ferrite can also be sufficiently magnetized using cost-effective permanent magnets and it is possible to dispense with expensive electromagnets.

It is to be noted that ideas relating to the disclosure are described herein in conjunction both with an angle sensor and/or with one of the toothed wheels that can be used therein and also with a method for producing a toothed wheel. It is clear to a person skilled in the art that the individually described features can be mutually combined in different ways in order also to arrive at other embodiments of the disclosure.

BRIEF DESCRIPTION OF THE DRAWINGS

Embodiments of the disclosure that are not to be regarded as limiting are described hereinunder with reference to the attached figures. The figures are only schematic and are not true to scale.

DETAILED DESCRIPTION

Figure 1:
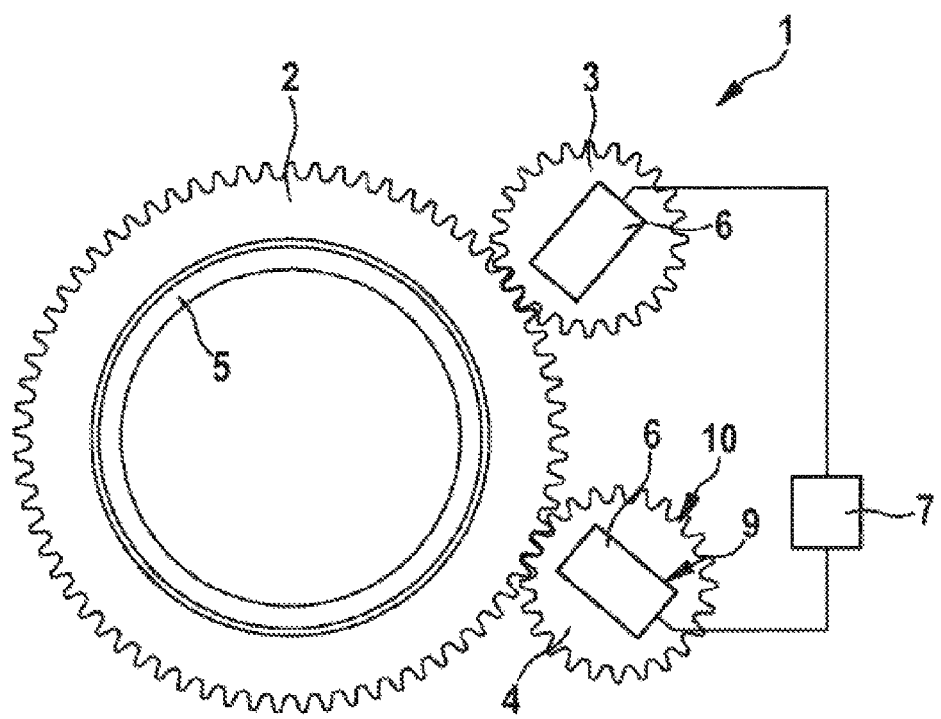
FIG. 1 illustrates a plan view of an angle sensor in accordance with the disclosure.

FIG. 1 illustrates in the plan view a schematic illustration of an angle sensor 1 in accordance with the disclosure. A large toothed wheel 2 is fixedly attached to a rotatable body 5, for example to the axis of a steering column in a vehicle. Two smaller toothed wheels 3, 4 mesh with the large toothed wheel 2, so that they co-rotate as the large toothed wheel 2 moves. The number of teeth differs in the case of the two small toothed wheels 3 and 4 by at least one tooth. The small toothed wheels 3, 4 are embodied completely from a magnetizable material. The toothed wheels are magnetized in a manner to produce a magnetic field that is to a great extent homogeneous and extends in parallel to an end face of the toothed wheels 3, 4.

Figure 2:
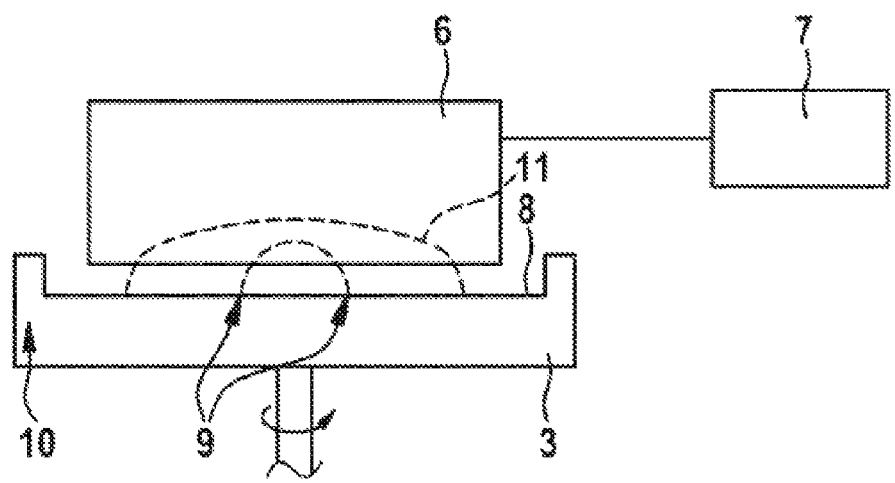
FIG. 2 illustrates a cross-sectional view of an angle sensor in accordance with the disclosure.

As is schematically illustrated both in FIG. 1 and also in the cross-sectional view of FIG. 2, a magnetic field sensor 6 is arranged in each case above the end face 8 of the toothed wheels 3, 4. This magnetic field sensor 6 is suitable for the purpose of detecting the orientation of the magnetic field 11 that is generated by the magnetized toothed wheel 3. It is possible to use for this purpose, for example, XMR sensors that directly change their resistance under the influence of a magnetic field and are therefore called "X-magneto resistive". For example, GMR sensors that use the "Giant Magneto Resistive" effect, or AMR sensors that use the "Anisotropic Magnetic Resistance" effect can be used.

The information obtained in this manner regarding the orientation of the toothed wheels 3, 4 can be transmitted to an evaluating unit 7, where it is possible, on the basis of the measured orientations and in the knowledge of the different number of teeth in the two toothed wheels 3, 4, to obtain an absolute measurement of an angle of rotation of the large toothed wheel 2 that is connected to said two toothed wheels.

As is roughly illustrated in FIG. 2, the magnetic field 11 that is generated by the toothed wheel 3 is detected by the magnetic field detector 6 solely in a central region 9 of the toothed wheel. The generated magnetic field 11 is not measured outside the central region 9, and in particular in an end region 10 in which the teeth are arranged. In the case of conventional measuring toothed wheels for angle sensors, a magnetized pill is therefore only arranged in the center of the toothed wheel 3 and is fixedly connected to the toothed wheel.

It has been observed in the case of the toothed wheels 3, 4 that are proposed herein and are embodied completely from a magnetizable material that a high level of magnetization within the edge region 10 can have a negative influence of the measuring accuracy with which the magnetic field sensor 6 can ascertain the orientation of the toothed wheel 3, 4. In order to minimize such negative influences, the magnetization in the case of the toothed wheel 3, 4 that is embodied completely from a magnetizable material is considerably greater in the central region 9 than in the edge region 10. For example, the magnetic field strength in the central region can have a maximum field strength that can be greater by the factor 5 to 10 than a maximum field strength in the edge region 10.

Figure 3:
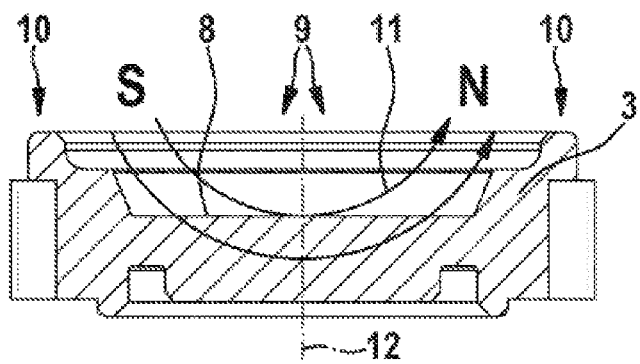
FIG. 3 illustrates a cross-sectional view of a toothed wheel in accordance with the disclosure for demonstrating as an example a two-pole, end-face magnetization.
Figure 4:
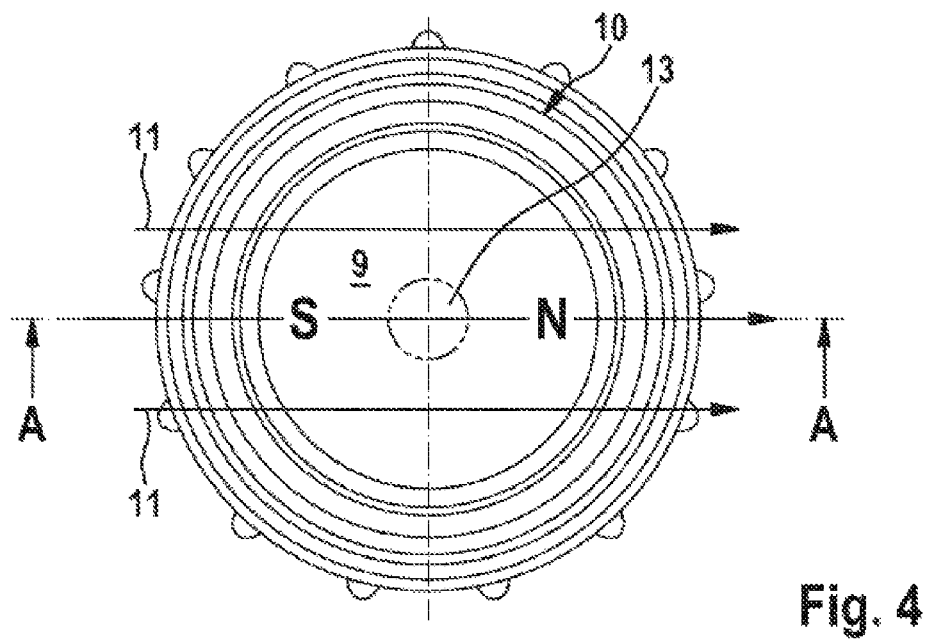
FIG. 4 illustrates a plan view of a toothed wheel in accordance with the disclosure for demonstrating as an example a two-pole end-face magnetization.
Figure 5:
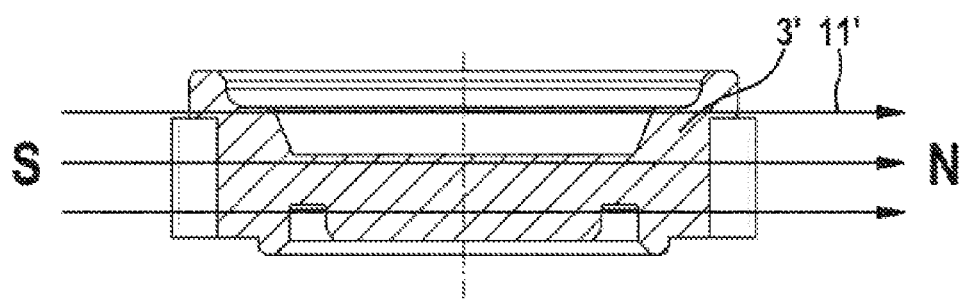
FIG. 5 illustrates a toothed wheel for demonstrating a diametric magnetization.

It has been established that, in order to achieve a magnetic field distribution of this type that is concentrated in the central region 9, it is advantageous to magnetize the toothed wheel 3, 4 in a manner that can be described as being multi-pole end-face magnetized or also as multi-pole surface magnetized. The FIGS. 3 and 4 illustrate schematically a sectional view and a plan view of the toothed wheel 3 that is magnetized in such a manner. The cross-sectional view illustrated in FIG. 3 was taken along the line A-A illustrated in FIG. 4. FIG. 5 illustrates in contrast thereto a conventional type of diametric magnetization. In the case of the two-pole end-face magnetization that is illustrated by way of example in the FIGS. 3 and 4, a magnetic field that is illustrated by the field lines 11 enters from an end face 8 of the toothed wheel 3 into the volume of the end wheel 3 and when the magnetic field has the corresponding sufficient strength, said magnetic field can magnetize the magnetizable material located there. The magnetic field 11 extends from a south pole S to a north pole N of a permanent magnet or electromagnet (not illustrated) that is adjacent to the end face of the toothed wheel 3. The magnetic field 11 is greatly nonhomogeneous in a plane that is transverse to the plane of the toothed wheel 3, as illustrated in FIG. 3, and said magnetic field magnetizes the toothed wheel 3 mainly in its central region 9. In contrast thereto, the magnetic field 11 is extremely homogeneous, i.e. the field lines (vector arrows) are to a great extent parallel, in a plane that is parallel to the end face 8 of the toothed wheel 3, i.e. in a plane that is orthogonal with respect to the axis of rotation 12 of the toothed wheel 3, as illustrated in FIG. 4. Whereas the entire toothed wheel 3 can, for example, be several centimeters large, the magnetic field 11 is only detected by the magnetic field sensor 6 in a small measuring range 13 inside of the central region 9. The magnetic field 11 that is generated is extremely homogeneous within this measuring range 13 and is therefore suitable for precisely ascertaining the orientation of the toothed wheel 3.

A conventional diametric magnetizing is illustrated in FIG. 5 solely for comparison purposes. A homogeneous magnetic field 11' passes through the entire toothed wheel 3' during the magnetization process and all the regions of the toothed wheel 3 are magnetized essentially to the identical strength. It has been established that, when said toothed wheel is magnetized in such a diametric manner, it is not possible to ascertain precisely the orientation of the toothed wheel 3' using the magnetic field 11' that is generated by said toothed wheel or said orientation can only be ascertained with an insufficient level of precision. It has been observed, for example, that in the case of otherwise similar magnetization parameters using a diametrically magnetized toothed wheel, it is only possible at the site of the magnetic field sensor to achieve a magnetic flux density that is not sufficient to reliably ascertain the angle, whereas using surface magnetization and/or end-face magnetization it was possible to achieve a flux density that is sufficient to reliably ascertain the angle.

Figure 6:
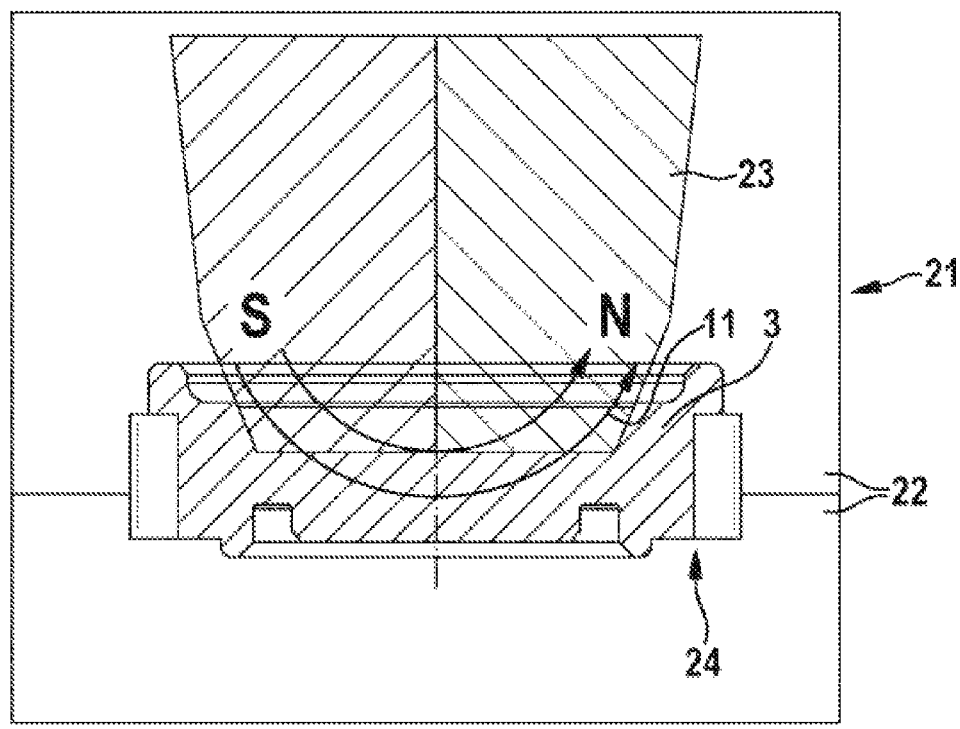
FIG. 6 illustrates a device that can be used for the production in accordance with the disclosure of a toothed wheel.

FIG. 6 illustrates a cross-sectional view of a device 21 that can be used for the production in accordance with the disclosure of a toothed wheel 3. The illustration is extremely schematic and the device 21 comprises a two-part mold 22 that comprises a cavity 24 in which the toothed wheel 3 can be produced using an injection molding method. For this purpose, a material that can be magnetized and is suitable for injection molding is introduced in a fluid or viscous state into the cavity 24, where it is subsequently to harden and finally to form the toothed wheel 3. Alternatively, the toothed wheel 3 can also be formed by means of a pressing process.

A mixture of magnetic powder and synthetic material granulate can be used as the magnetizable material, which mixture is conventionally used when producing synthetic material composite magnets. The magnetic powder that comprises small magnetizable particles can be distributed uniformly within the synthetic material matrix after the synthetic material granulate has liquefied and subsequently re-hardened. It is possible to use for the magnetic powder in particular a hard ferrite powder, for example hard ferrite 16/21p according to DIN IEC 60404-8-1. This magnetic powder is comparatively cost-effective. Alternatively, it is also possible to use a magnetic powder comprising NdFeB, as is used when producing conventional magnetic pills. Although this magnetic powder can in principle be magnetized to a greater extent, it is, however, also considerably more expensive and more difficult to magnetize that hard ferrite.

In order to be able to magnetize the toothed wheel 3 during the injection molding process, a permanent magnet 23 is integrated in addition in the device 21. The permanent magnet 23 generates a magnetic field 11, as has been mentioned previously with regard to the FIGS. 3 and 4. For this purpose, the permanent magnet 23 abuts against the cavity in which the toothed wheel 3 is formed. In this manner, the magnetic field 11 can influence the magnetizable material that is used to form the toothed wheel 3, provided that said material has not yet hardened. The magnetic field 11 can be effective during the entire hardening process that can, for example, take 10-20 sec in the case of conventional injection molding methods. It has been observed that in this manner the magnetization that is generated in the toothed wheel 3 can be greater and more stable than when the already completely hardened toothed wheel is subsequently magnetized. As a result of this improved magnetizing effect, a material that comprises hard ferrite can therefore also be used for the toothed wheel 3, although hard ferrite can generally only be magnetized to a lesser extent than NdFeB. In addition, it has also been observed that hard ferrite can also be re-magnetized even in the case of weaker magnetic field strengths than NdFeB, so that it is also possible to use for the magnetizing process permanent magnets that can generally provide weaker magnetic field strengths in comparison to electromagnets.

The invention claimed is:

1. A toothed wheel for an angle sensor, comprising:
   a wheel body; and
   a plurality of teeth extending from a periphery of the wheel body,
   wherein the wheel body and the plurality of teeth are embodied completely from a magnetizable material, and
   wherein at least a portion of the magnetizable material of the wheel body is magnetized and defines a level of magnetization, and
   wherein the level of magnetization is greater at a central region of the wheel body than at the periphery of the wheel body.

2. The toothed wheel as claimed in claim 1, wherein an end face of the wheel body is magnetized.

3. The toothed wheel as claimed in claim 1, wherein the level of magnetization is essentially homogeneous in the central region of the wheel body in a plane that is orthogonal with respect to an axis of rotation of the toothed wheel.

4. The toothed wheel as claimed in claim 1, wherein the magnetizable material comprises magnetizable particles embedded in a moldable matrix material.

5. The toothed wheel as claimed in claim 1, wherein the magnetizable material comprises hard ferrite.

6. An angle sensor for ascertaining an angle of rotation of a rotatable body, comprising:
   at least one toothed wheel embodied completely from a magnetizable material, the at least one toothed wheel configured to cooperate with the rotatable body and to rotate about an axis of rotation in response to rotation of the rotatable body, at least a portion of the magnetizable material being magnetized and configured to generate an essentially homogenous magnetic field; and
   a magnetic field sensor configured to ascertain an orientation of the essentially homogenous magnetic field,
   wherein the homogeneous magnetic field lies in a plane that is orthogonal with respect to the axis of rotation of the at least one toothed wheel.

7. The angle sensor as claimed in claim 6, wherein the at least one toothed wheel includes:
   a wheel body; and
   a plurality of teeth arranged along a periphery of the wheel body,
   wherein a level of magnetization of the essentially homogenous magnetic field is greater at a central region of the wheel body than at the periphery of the wheel body.

8. A method for producing a toothed wheel for an angle sensor, the toothed wheel including a wheel body and a plurality of teeth arranged along the periphery of the wheel body, the method comprising:
   embodying the entire toothed wheel from a magnetizable material;
   magnetizing the toothed wheel in such a manner that the toothed wheel is magnetized to a greater extent in a central region of the toothed wheel than in an edge region in which the teeth of the toothed wheel are arranged.

9. The method as claimed in claim 8, wherein the toothed wheel is magnetized while the toothed wheel is arranged inside a mold that is used to form the toothed wheel.

10. The method as claimed in claim 8, wherein the magnetization process is performed with the aid of one or more of a permanent magnet and an electromagnet that is arranged adjacent to an end face of the toothed wheel.

11. The toothed wheel as claimed in claim 1, wherein the magnetizable material of the plurality of teeth is not magnetized.

* * * * *